United States Patent [19]

Saylor

[11] Patent Number: 5,268,837
[45] Date of Patent: Dec. 7, 1993

[54] ROBOTICS WORKSTATION

[75] Inventor: Michael J. Saylor, Carlisle, Mass.

[73] Assignee: Digital Equipment Corporation, Maynard, Mass.

[21] Appl. No.: 872,821

[22] Filed: Apr. 23, 1992

[51] Int. Cl.⁵ .......................................... G06F 15/46
[52] U.S. Cl. .............................. 364/167.01; 364/468; 395/83; 395/86
[58] Field of Search ........... 364/167.01, 468, 131-134, 364/191-193, 149-151; 395/80, 82, 83, 84, 904, 906, 85, 86

[56] References Cited

U.S. PATENT DOCUMENTS

| | | | |
|---|---|---|---|
| 4,503,507 | 3/1985 | Takeda et al. | 395/83 X |
| 4,586,151 | 4/1986 | Buote | 395/83 X |
| 4,891,765 | 1/1990 | Hatori et al. | 385/83 X |
| 4,896,087 | 1/1990 | Onaga et al. | 395/83 X |

OTHER PUBLICATIONS

Miller, David J., "An Object-Oriented Environment for Robot System Architectures", IEEE International Conference on robotics and Automation, Cincinnati, Ohio, May 13-18, 1990.
Camarinha-Matos L. M. et al., "An Integrated Robot Cell Programming System", Proceedings of the International Symposium and Exposition on Robots, Sydney, Australia, 6-10 Nov. 1988, pp. 1297-1315.

Primary Examiner—Joseph Ruggiero
Attorney, Agent, or Firm—Fish & Richardson

[57] ABSTRACT

An interface for enabling an application program to control the movement of objects within a robotics workstation, the workstation including a plurality of objects, the plurality of objects being members of a group of objects, the interface including a module for representing a model of the workstation, the model including a representation of the locations of objects within the workstation; a module for processing a command from the application program, the command identifying a first object of interest, a second object of interest and a desired movement, the first and second objects of interest being selected from among the plurality of objects, the processing module including a module for identifying a robot that connects the first and second objects of interest within the model; and a module for sending a motion command to the identified robot.

14 Claims, 7 Drawing Sheets

| TYPE |
|---|
| 41 — RELATIVE_LOCATION( ) |
| 42 — BASE_REFERENCES (me) |
| 43 — MATCHING_BASE_REFERENCES (me, search_type) |
| 44 — IN_BASE_REFERENCES? (me, search_type) |
| 45 — FIRST_BASE_REF_MATCH (me, search_type) |
| 46 — ALL_BASE_REF_MATCHES (me, search_type) |
| 47 — MOVE( ) |
| 48 — SELECT_ROBOT( ) |

| 51 — ME.ENCODER |
|---|
| 52 — ME.DIST_PER_ENC |
| 53 — ME.JOINT |
| 54 — ME.LOCATION |
| 55 — ME.MAX_POSTION |
| 56 — ME. MIN_POSITION |
| 57 — ME. MAX_SPEED |
| 58 — UPDATE_POSITION( ) |

ROBOTICS WORKSTATION

BACKGROUND OF THE INVENTION

The invention relates to an interface between an applications program and a robotics workstation.

Traditional industrial automation programs are developed to perform some manufacturing process in an industrial automation workstation. The workstation typically will have several kinds of objects in the workspace, e.g. tools, parts, feeders. The workstation will have some form of motion devices to move objects from one location to another, or perform some task on an object with some tool. The motion devices may be simple linear motion slides or rotary tables, or may be some combination of slides and rotary devices to form what is typically called a robotic manipulator, or arm, or simply a robot.

The first industrial programs commanded these motion devices in raw motion sensor units. These types of programs were very specific to the arrangement and location of objects in the workspace. If the location of objects changed in the workspace or if different motion devices were used (e.g. hardware upgrades or redesigns), the application programs would have to be modified to account for these changes. These programs required constant modification over the applications lifetime. These types of programs were expensive to maintain.

The next generation of industrial automation programs commanded motion devices in engineering units and specified the location of objects in the workspace in engineering units also. Developments in robotics research in the late 1960's and throughout the 1970's, lead to methods of solving the kinematic equations of robots. This allowed the motion commands to robots to be expressed in engineering units while the kinematic equations solved for the raw motion device commands to achieve that "world space" command. These world space commands allowed some hardware upgrades and redesigns without having to modify the application programs. Application programs still had to know the relation of objects in the workspace, and determined what motion device to use to achieve some task.

The third generation of industrial programs allowed location of objects in the workspace to be expressed relative to some other object. These application programs for robots were often written in a robotic programming language such as VAL(tm), RAIL (tm), AML (tm), and Karal (tm). These languages provide support for expression of location relative to another location, typically called "reference frames".

Reference frames provide a level of application program independence from total details of the location of objects in the workstation. An example is if 5 locations are referenced off of one common location, then changing the one common location will automatically adjust the world location of the other 5 locations. Applications written in these third generation systems still had to have explicit knowledge of what location is relative to what other location. If the relationship of one location to another is changed, the application needed to be modified. In addition, application programs still had to know what motion device to use to perform a task. These limitations hampered the reuse of application programs to other tasks, or to rearrangements of objects within the workspace.

SUMMARY OF THE INVENTION

The invention is a robotic system that shifts the typical robotic focus from the end effector and the robot to the more application oriented objects such as parts and tools. This application oriented focus produces robotic applications that are expressed in terms of the task at hand while hiding the details of what robot is necessary to perform the task. This provides a very high level of robot independence to the application program. This independence from specific robot knowledge allows the construction of generic, reusable application programs that can be applied to a wide variety of robot specific workstations.

In general, in one aspect, the invention features an interface for enabling an application program to control the movement of objects within a robotics workstation. The workstation includes a plurality of objects that are members of a group of objects. The interface includes means for representing a model of the workstation, the model including a representation of the locations of objects within the workstation; and means for processing a command from the application program, the command identifying a first object of interest, a second object of interest and a desired movement, the first and second objects of interest being selected from among the plurality of objects. The processing means includes means for identifying a robot that connects the first and second objects of interest within the model; and means for sending a motion command to the identified robot.

Preferred embodiments include the following features. The model specifies relative locations of objects with respect to other objects within the workstation. The workstation includes a plurality of robots each of which is made up of a corresponding set of motion axes. The identifying means includes a registry of all of the robots, which specifies for each of the robots a corresponding set of motion axes; means for searching the model to identify a set of robots that connect said first and second objects of interest to each other within said workstation; means for identifying a set of motion axes corresponding to said set of robots; and means for searching the registry to identify a single robot that corresponds to the identified set of motion axes.

Also in preferred embodiments, each of the objects is represented in the model by a corresponding data structure and the model includes one or more linked lists of data structures for the objects. The locating means includes means for identifying among the one or more linked lists linked lists that contain the data structures corresponding to the first and second objects of interest. In addition, the identifying means includes means for searching through the identified linked lists to identify the set of robots that connect the first and second objects of interest to each other within the workstation. The locating means further includes means for identifying a single robot that corresponds to the identified set of robots. The interface also includes means for computing a tool center point from at least one of the first and second objects of interest to the identified robot. The sending means supplies the computed tool center point to the identified robot.

In general, in another aspect, the invention features a method for enabling an application program to control the movement of objects within a robotics workstation. The workstation includes a plurality of objects. The method includes generating a model of the workstation, the model including a representation of the locations of objects within the workstation; issuing a command from the application program, the command identifying a first object of interest, a second object of interest and a desired movement, the first and second objects of interest being selected from among the plurality of objects; in response to receiving the identity of the first and second objects of interest, automatically identifying a robot that connects the first and second objects of interest within the model; and sending a motion command to the identified robot.

The invention enables application programs to work directly with the objects most critical to the application and to be independent of specific workstation configuration. In other words, the application programs may be independent of the position of objects in the workstation, independent of robots in the workstation, and independent of specific types of equipment resources in the workstation. Thus, the robotic architecture of the invention enables application programs to be widely reusable in different applications.

Of course, some applications may not be able to always to achieve these objectives fully. An example would be an application program that moves objects along highly complex trajectories through the workstation in order to avoid collisions. Nevertheless, these applications can still be much more reusable than traditional robotic applications by following the principles underlying the invention as much as possible.

Other advantages and features will become apparent from the following description of the preferred embodiment and from the claims.

DESCRIPTION OF THE PREFERRED EMBODIMENT

STRUCTURE AND OPERATION

Figure 1:
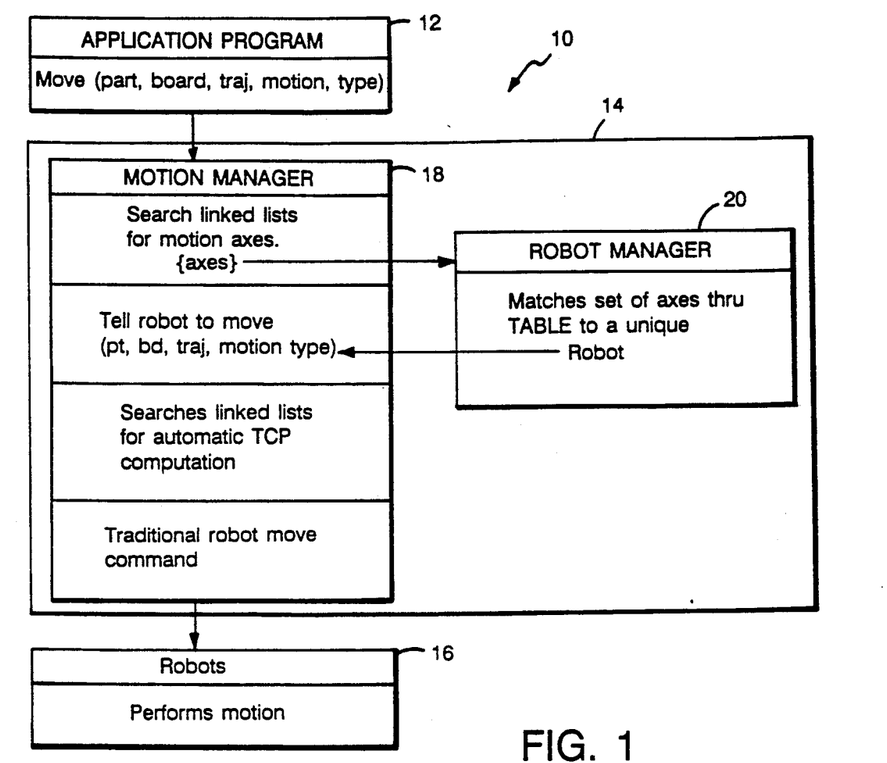
FIG. 1 is a functional block diagram of a robotics system.

As shown in functional block diagram form of FIG. 1, a robotic system 10 embodying the invention includes an application progam 12, a robot interface 14, and a set of robots 16 which make up a workstation. Robot interface 14 includes two subsystems, namely, a motion manager 18 and a robot manager 20, which in combination possess a model of the configuration of the workstation. As will be described in greater detail below, robot interface 14 serves to isolate application program 12 from having to know details about the configuration of the workstation thereby enabling it to operate on objects within the workstation without having to know about or to directly control the robots that move or handle those objects.

Robot interface 14 maintains the relative location of objects within the workstation separate from the application program. Examples of typical objects found within the workstation are feeders, parts, robots, and tools. In the described embodiment, robotic system 10 uses object oriented data types to model the configuration of the workstation.

A brief functional overview of robotics system 10 will be provided, followed by a description of the details of a particular implementation.

Application programs in robotics must move objects around the workstation in order to perform automated tasks. Examples are putting parts in pallets or moving a welding torch along a seam. In the described embodiment, application program 12 commands objects of interest (e.g. a part in a tool) to move to some position relative to some object (e.g. a pallet position). Thus, for example, application program 12 issues a move command that directs the object of interest to a location (e.g. to another object of interest). The move command may be of the form move(part, board, traj, motion_type) where part and board are both objects located within the workstation environment and identified in the model of that environment that is maintained by robot interface 14. This command instructs the robotics system to move the part to the board over a trajectory defined by traj using a specified motion type (e.g. asynchronous or synchronous). Note that the command does not make reference to the location of the objects within the workstation or to the particular robots that may be required to carry out the operation.

Motion manager 18 provides the motion interface to command the objects of interest to move around the workstation. Motion manager 18 responds to the command by searching its model of the workstation to automatically determine what set of motion axes are required to carry out the move that is being commanded. Motion manager 18 takes the first and second objects of interest specified in the command and identifies the set of motion axes that connect those objects of interest to the workstation and thus to each other. It passes the identified set of motion axes to robot manager 20.

Robot manager 20 describes a robot as a collection of motion axes that can produce coordinated motion of its end effector. Robot manager 20 maintains a lookup table of all robots that are defined within the workstation. This table is set up at the time that the system is configured by the user. The table identifies each robot within the system as a unique set of motion axes. Note that only robots that are identified within this table are accessible to the application program. Robot manager 20 compares the identified set of axes to the different sets of axes in its tables. If it finds a matching set of axes, robot manager 20 returns the identity of the robot to which that set of axes belongs. If no matching set is found, an error is returned to motion manager 18 indicating that the requested move command cannot be implemented by the robotics system.

If a unique robot is returned by robot manager 20, motion manager 18 automatically computes the tool center point (TCP) for the identified robot. It does this by searching its model for the first robot that is connected to the robot and the location of the object of interest. As will be described in greater detail later, the model of the workstation contains relative location information which makes this determination both possible and relatively easy.

After motion manager 18 determines the TCP for the identified robot, it sends a traditional move command to the identified robot. The move command specifies the TCP for the object of interest and the trajectory over which the move is to take place. The robot then carries out the requested motion using techniques and mechanisms that are standard in the art.

Thus, robot interface 14 dynamically determines which robot to select, thus providing the desired robot independence for the application program. Also, traditional robotics describe the motion of the robot's end effector, the Tool Center Point (TCP), through space. Robot interface 14 enables application programs to work directly on the objects of interest thereby reducing the emphasis on the end effector. The end effector is typically only occasionally of interest to the application program. The real objects of interest are more often other objects such as parts and feeders. Robot interface 14 accommodates these varying points of application interest by dynamically determining the TCP for the dynamically selected robot.

The Object Oriented Type Library

In the described embodiment, robot interface 14 and the robots are implemented using an object oriented type library of different types or classes that achieve the above-described objectives. A type or a class is a grouping of particular data with functions that are to be used with that data. The types used in the described embodiment will now be described, beginning with a description of the spatial representations that are used.

To express the concepts of locations in space and a path of connected points through space, robotic system 10 uses location types and trajectory types, respectively.

A location is a point in space. Robotic system 10 uses the standard homogeous transformation representation to describe a point in space and its orientation (e.g. see Richard P. Paul, *Robot Manipulators: Mathematics, Programming, and Control*, MIT Press, 1981). A location type which is constructed as:

Loc'{X, Y, Z, Rz, Ry, Rz} encapsulates the data representation and the location operators. This allows convenient specification of the location. The coordinate system chosen is the x,y,z position vector and the orientation angles are the Euler angles for rotations about the Z axis, then the next Y axis, and then the last Z axis. Any trailing values may be omitted and are zero filled. This choice of Euler angles and zero filling of missing values allows concise specification of locations that are just translations, Loc'{X, Y, Z} or, that can be expressed as a translation and a rotation about the z axis,

Loc'{X, Y, Z, Rz} as often occurs in planar applications such as electronic assembly. The x, y, and z components of a location L may be addressed as L.x, L.y, L.z.

The major operations that are definded on robotic transformations are the multiplication and inverse operators. The notation for location multiplication is

C:=A@B where A, B, and C are locations. The inverse syntax is inverse_A := ~A where tilda is the unary inverse operator for locations types.

A trajectory is defined as a path through space as a function of time:

Traj=F(t)

Figure 2:
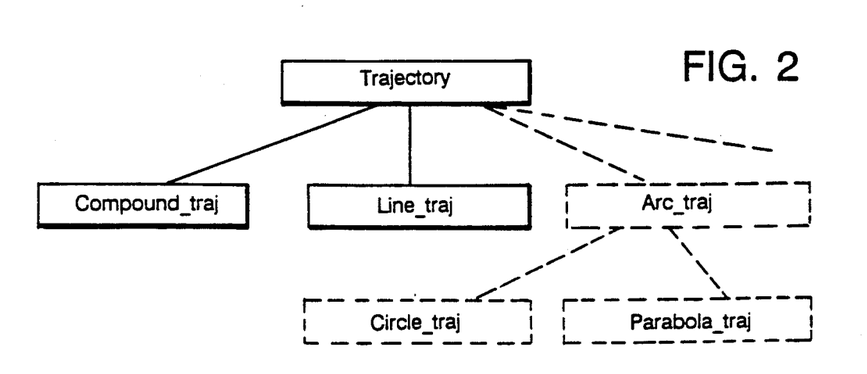
FIG. 2 shows a trajectory type heirarchy.

This completely general concept is the abstract supertype for more specialized trajectories such as the traditional robotic paths made from linear line segments and circular arcs. More complex types such as splines or time varying traversal of a path are possible. FIG. 2 shows the type heirarchy for some trajectories employed in robotic system 10.

Trajectory is the abstract supertype for all trajectories. It defines the interface to a trajectory as Position(me, time), Velocity(me, time), and Acceleration(me, time). Position(me, time) returns a location along the trajectory at the specified time. Velocity(me, time) returns the translation speed along the trajectory at the specified time. And Acceleration(me, time) returns the translation acceleration along the trajectory at the specified time.

There are at least three derived classes from the abstract class trajectory, namely, Compound_traj, Line_traj, and Arc_traj. Compound_traj is a compound trajectory made up of a series of other trajectories. An example is a trajectory that consists of a straight-line path followed by a circular arc followed by a parabolic arc, or a trajectory of straight line paths at different speeds. Line_traj is a constant speed linear translation path. Line_traj's are specified by the points in their path where changes in the linear direction of the path but not the translational speed occur. Examples are a constant speed rectangular path, or a constant speed zig-zag path. The traditional robotic line segment path is a compound_traj made from line traj's of different speeds. And Arc_traj could be a trajectory that is described by a continuous analytic function. Subtypes could be circle trajectories or parabolic trajectories.

Trajectories may be offset by relative transformations using the * operator. For example, new_traj:=A * old_traj * B where A and B are relative transformations (locations) and new_traj, old_traj are trajectories. Offsets are applied to the entire trajectory. The precedence of the * operator is lower than that of the location @ operator. This provides for descriptions of compounded offsets without the use of parentheses. Example:

new_traj:=A @B * old_traj * B @C is equivalent to new traj:=(A @B) * old_traj * (B @C)

Located_Object

To maintain the location of objects within a workstation, robot interface 14 provides an abstract data type called located_object 30 (see FIG. 3) that describes the location of an object relative to another object. The other object may also be relative to yet another object. This forms a relative reference chain of located_objects 30. The root of a relative reference chain is the "world reference point", which is a common located position object to which all objects in the workstation are referenced. A workstation object is usually the next located_object in the chain and it represents the relative reference point for all of the robots within the workstation. This model or representation gives the position of each object relative to each other. Robot interface 14 uses the information in located_objects 30 to determine how to achieve the application commanded motion of objects throughout the workstation.

Figure 3:
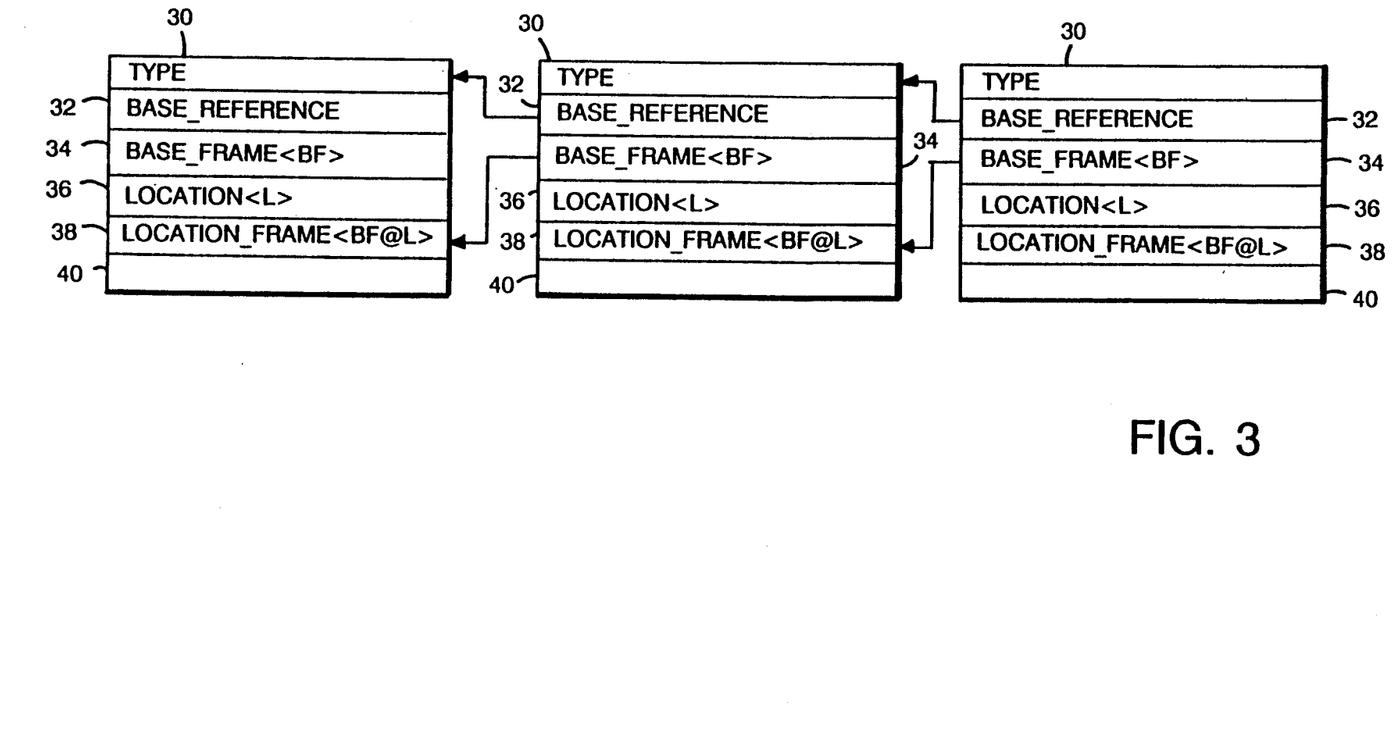
FIG. 3 is a linked list of located_object data structures.

In addition to identifying the type or subtype of the object being represented, the located_object type has four data attributes for tracking the location of objects relative to other objects. As shown in FIG. 3, each located_object 30 has a base_reference attribute 32, a base_frame attribute 34, a location attribute 36, and a location_frame attribute 38. As represented by field 40, located_objects 30 also include other attributes and operators, which will be described later.

Base_reference attribute 32 points to a located_object 30 that the location is relative to. This forms a backwards chain of relative locations. The first object in the chain, i.e., the "world reference point", has a baser_reference that is NIL. Location attribute 36 is the location of this object relative to its base_reference, i.e., the next located_object 30 in the base reference chain. This may be a static field or a dynamic computation. For example, a subtype that is moved by other objects has this location modified as a static field update by the object that moved it. A subtype that moves itself such as a robot computes this value based on its internal information such as the position of its motion axes.

Location_frame attribute 38 is a computed attribute that describes the location of this object in the "world" reference frame (the very beginning reference of the co-ordinate system). It is the product of all the locations in the reference chain. Finally, base_frame attribute 34 is the location_frame of this object's base reference. Its inclusion simplifies the computation of the location_frame.

Figure 4A:
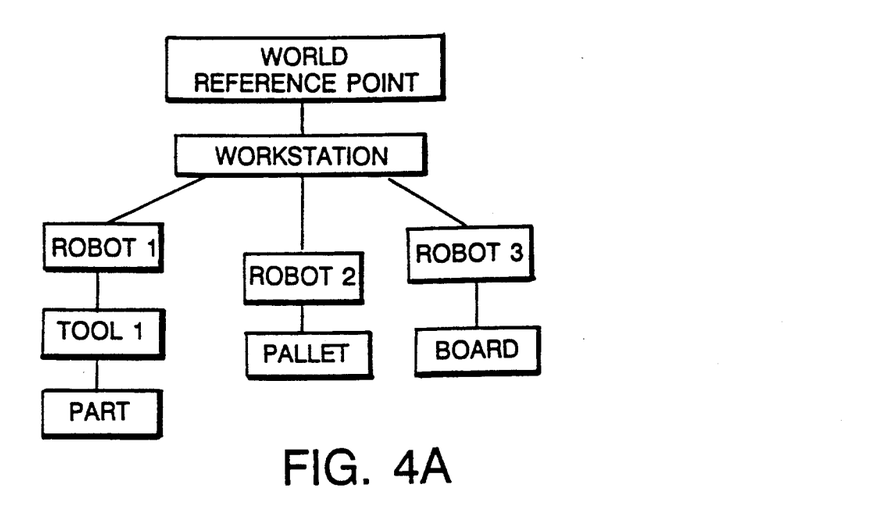
FIGS. 4a and 4b show an example of base_reference chains for a particular workstation.

Since there typically are multiple robots and other objects within a workstation, the complete data structure formed by the located_object data type for the workstation environment is a tree structure such as is illustrated by FIG. 4a. In that example, the workstation environment includes three robots, namely, ROBOT1, ROBOT2, and ROBOT3. Each robot is represented by a located_object 30 of type robot. ROBOT1 holds an object TOOL1 which in turn holds another object PART. ROBOT2 holds an object PALLET. And ROBOT3 holds an object BOARD. The root of the three base reference chains is the "world reference point".

Figure 4B:
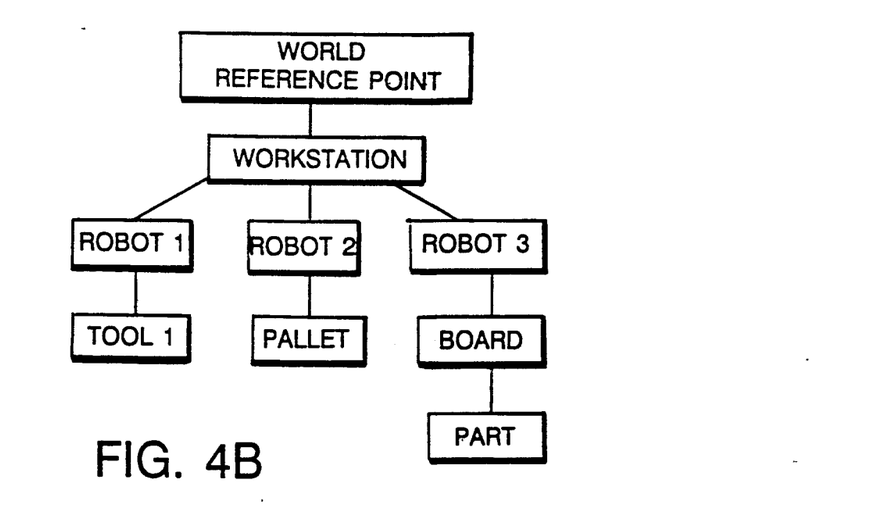

The application program or application library procedures alter the structures of the base_reference chains to reflect the outcomes of completed commands that are implemented by the robots. For example, application program 12 might issue a move command which instructs PART to be moved to BOARD over some specified trajectory. When that command has been completed and PART is on BOARD, application program 12 breaks the link from the located_object for PART to the located_object for TOOL1 and creates a new link, linking the located_object for PART to the located object for BOARD. The resulting configuration of the linked lists of located_objects is as shown in FIG. 4b.

In terms of the convention presented earlier, the relative location of one located_object B to another located_object A is given by:

~A.location_frame @B.location_frame.

As shown in a more complete representation of the contents of located_object 30, it also includes a relative_location( ) operation which computes this equation. Relative_location( ) attempts to minimize the number of location multiplications required by examining the reference chain of the me and reference_object for references to each other. The location_frame data attribute need only be computed from the common base reference, not from the very root of the reference chain, the "world reference point".

Finding Objects in the Base Reference Chain

Figure 5:
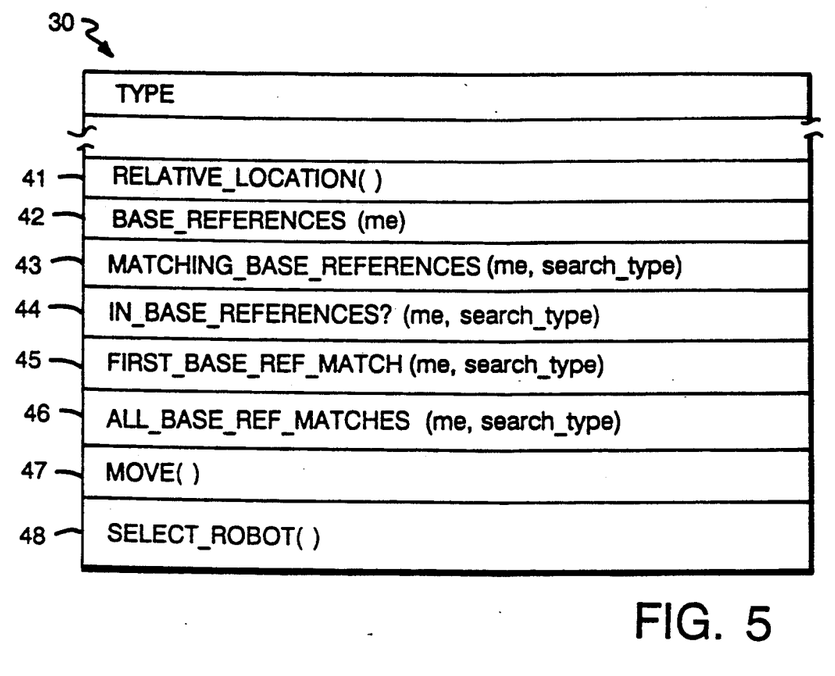
FIG. 5 shows selected operators and iterators of the located_object class.

Finding certain objects or certain types of objects that are in the located_object reference chain of a particular located_object A is easily accomplished by searching through the base_reference chain for the desired object. Referring to FIG. 5, located_object provides several iterators to hide the implementation details of this search and it provides some other operations to perform other common functions.

For example, there are two iterators, namely, base_references(me) and matching_base_references(me, search_type). Base_references(me) yields up each base_reference in the chain, one at time, going backwards through the chain. Matching_base_references(me, search_type) yields up each base_reference in the chain that is the same type as <search type>, one at time, going backwards through the chain.

There are also three other operators that return useful information about the base_reference chain. An in_base_references? (me, search_object) operator returns TRUE or FALSE if the <search object> is in the base_reference chain. A first_base_ref_match(me, search_type) operator returns the first object in the base_reference chain that is of type <search type>. And, an all_base_ref_matches(me, search_type) operator returns a sequence of all the objects in the base_reference chain that are of type <search_type>.

Commanding Motion of Objects

Applications which use robot interface 14 directly command objects to move. This isolates the application program from having knowledge of what robot will actually move the object. The operation move(me, destination_object, traj, motion_command_type) is the motion command interface for application programs. Among the arguments required by this command, <me> is the located_object that should move, <destination_object> is another located_object that is the destination, <traj> is the trajectory to traverse to get to the destination (it is relative to the destination), and <motion_command_type> is a qualifier on how the motion command should be performed.

An example of such a command is: move(part, pallet.slot[1], approach_trajectory, mot_async) This command tells the part to move itself to the first slot in a pallet. It should approach the first pallet slot along the path and with the speed specified in the trajectory approach_trajectory. The move command starts the motion and returns to the application program immediately so that the next application command can happen asynchronously with the motion.

Note that robot interface 14 does not provide a task planning environment. Thus, the example move command assumes that the part is somehow attached to a set of axes that can move the part to the board. Typically this would be accomplished by having the application program commanding the tool to pickup the part first. Robot system 10 provides various operations as applications libraries that perform commonly used tasks such as getting a part from a feeder (get_part_from_feeder), or returning a part to a feeder (return_part_to_feeder). Robot interface 14 does not attempt to assemble a whole task sequence from just the command to move a part to a board as a task planning system might. It is the job of the application program to decide which tool to use, when to pick up a part, and what to do with the part.

Robot Related Types

A robot is defined in the robotic system as a collection of motion axes that performs coordinated, world space moves of a Tool Center Point (TCP). There may be one or more motion axes that make up a robot. Motion axes may be shared among different robots. And robots may be made from other robots. The robotic system provides access control over shared axes to prevent conflicting motion commands being issued to the shared axis.

The primary interface to the robots is a move( ) command 48 found in the located_object type (see FIG. 5). The located_object move(II) command 47 determines which robot is required to achieve the desired motion and then calls a move_robot command of the robot. Robot interface 14 automatically selects the required TCP for each move of a robot. The motion of the robot is to move the desired object at the calculated TCP along the specified trajectory. This requires the coordinated motion of the robot's set of axes.

Figure 6:
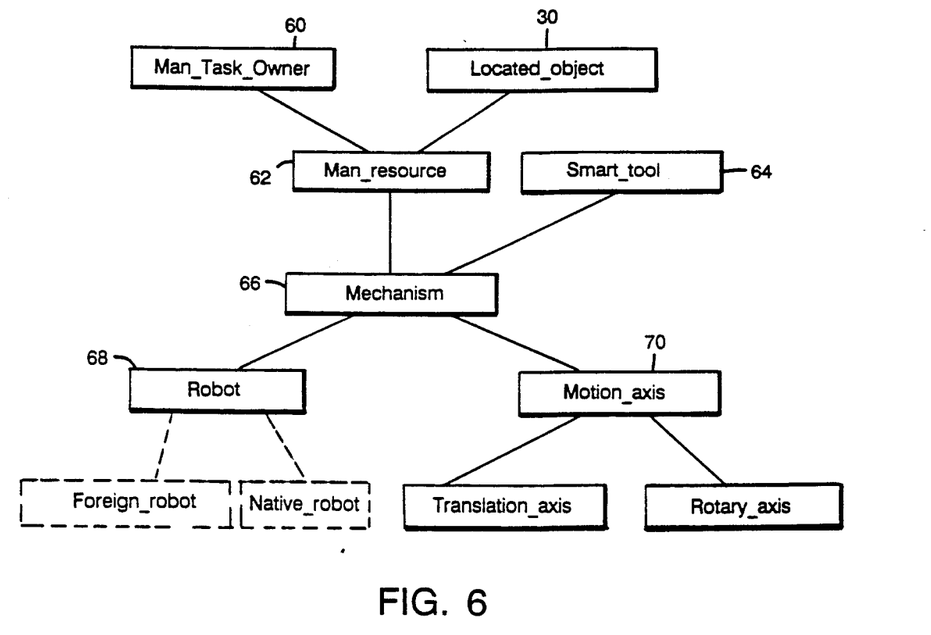
FIG. 6 shows a partial type heirarchy of robots and motion axes.

In the described embodiment, robots and motion_axes are subtypes of located_object and other types which form a hierarchy of types as shown in FIG. 6. Briefly, the types are as follows. Man_task_owner types 60 have a Bill of Process (BOP) that stores application programs that work for this type. Examples would be workstation calibration and configuration programs. Man_resource types 62 provide access control to manufacturing resources, typically equipment. Smart_tool types 64 have an intelligent controller that controls the resource and accepts commands to perform actions with the resource. Examples are robot and vision controllers. The Mechanism type 66 serves as a common supertype for a robot type 68 and a motion_axis type 70 which brings together common behavior.

Motion_axis

A motion_axis in the robot interface is a one Degree of Freedom (DOF) motion axis. A motion axis is commanded to move in its position space by the operation move_axis (me, position, velocity).

A motion_axis may be either a rotary type of axis or a linear translation type of axis. The prime difference between rotary and translation motion_axis is just the allowable units on the position command arguments. The position commands must be of the linear unit type for translation commands and of the angular unit type for angular axis commands.

Figure 7:
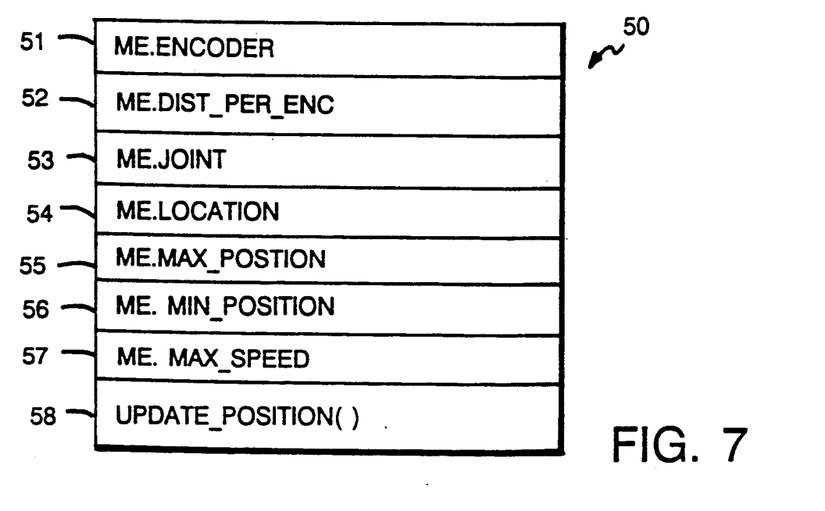
FIG. 7 shows selected attributes of the motion_axis class.

A motion_axis type 50 includes the data attributes shown in FIG. 7 to maintain the state of the axis. A me.encoder attribute 51 represents the position of the axis in raw position feedback device (the encoder) units. The default behavior of a motion_axis is for this value to equal the last command sent to the device. An update_position( ) operation 58 is used to interrogate an axis for its true present reading.

A me.dist_per_enc attribute 52 is the conversion factor from raw encoder counts to engineering units, the distance per encoder count. A me.joint attribute 53 is the position of the axis in engineering units. It is the product of me.encoder and me.dist_per_enc. A me.location attribute 54 returns a location of the axis on the me.joint value. Me.max_position and me.min_position attributes 55 and 56 are the maximum and minimum position limits, respectively, to which the axis can move. And a me.max_speed attribute 57 is the maximum speed at which the axis can move.

The robot system provides a transparent layer between the motion_axes and the application programs. Thus, application programs need not deal with motion axis operations or data attributes directly.

As indicated in FIG. 6, a motion_axis is a smart_tool which means that it has an intelligent motion controller that executes the motion commands. The robot interface as implemented by the object oriented data types provides the communication interface to this smart controller and translates generic motion commands into the required specific controller syntax. This allows the robot interface to be easily configured to work with a variety of different motion controllers. The application program never uses a device dependent syntax so it can maintain its independence from specific vendor's motion controllers.

Robot Type

The robot type provides control to the set of axes that make up a robot. It provides for robot management and robot motion. Under robot management function, it registers all the robots in the workstation and provides selection facilities to determine which robot is required to move for a given motion command. Under the robot motion function, it determines how to perform the required coordinated moves to move the TCP along the specified trajectory.

Figure 8:
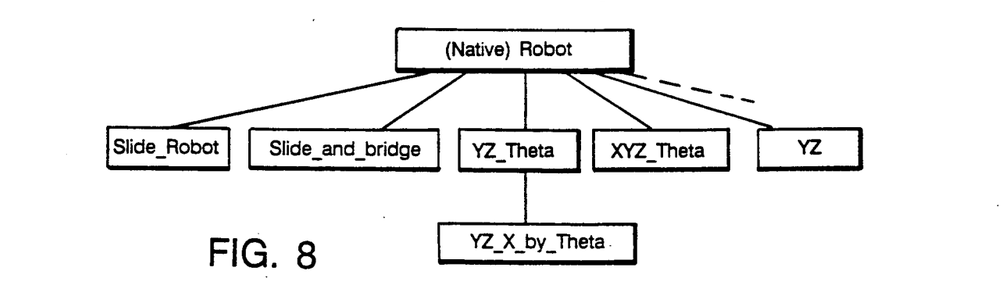
FIG. 8 shows a robot subtype heirarchy.

FIG. 8 shows a type heirarchy for robot. The native_robot type provides the coordinated robot motion functionality for a set of axes that do not have a robot controller external to the robot interface. The foreign_robot type communicates robot interface motion commands directly to a set of motion axes that do have an external robot controller.

Robot Manager

The robot management functionality is provided as type operations of the robot type. These are referred to as the robot manger operations and implement the functionality of robot manager 20 shown in FIG. 1. The purpose of the robot manager is to determine which robot is made up from a set of motion axes. This functionality is used by a located_objectmove( ) operation (to be described shortly) to select the required robot to perform a desired move.

Figure 9:
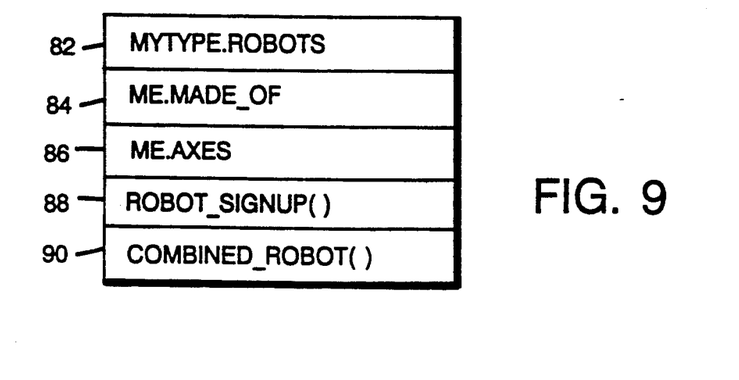
FIG. 9 shows selected attributes and operators of the robot type class.

The robot manager system provides the attributes and operations shown in FIG. 9. A mytype.robots attribute 82 is a set of all the robots in a workstation. In other words, mytype.robots 82 implements the table used by robot manager 20 to determine which set of axis corresponds to which robot in the workstation. A me.-made_of attribute 84 is a set of all the robots that make up a particular instance of a robot. A me.axes attribute 86 is the collection of motion_axis that make up a particular instance of a robot. A robot_signup( ) operator 88 registers a newly created robot into the mytype.robots set. And, a combined_robot( ) operator 90 returns a specific robot that is made from the collection of robots passed as input arguments.

The robot manager section of the robot type also provides for access control over the motion axes that make up a robot. Robot type reimplements two operators from man_resource, namely, new_key( ) and set_our_key( ). New_key( ) has all robots and motion axes use a common lock to provide access control while attempting to gain control of a set of axes. Set_our_key( ) updates individual motion_axis access keys in all axes that make up a selected robot.

Dynamic Robot Selection

As noted earlier, application programs command a located_object to move along a trajectory. The motion manger dynamically determines which robot is required to move and then commands that robot to move along the desired trajectory. This isolates the application program from the details of the configurations of robots in a workstation. The selection process in the located_object type is as follows shown in FIG. 10.

Figure 10:
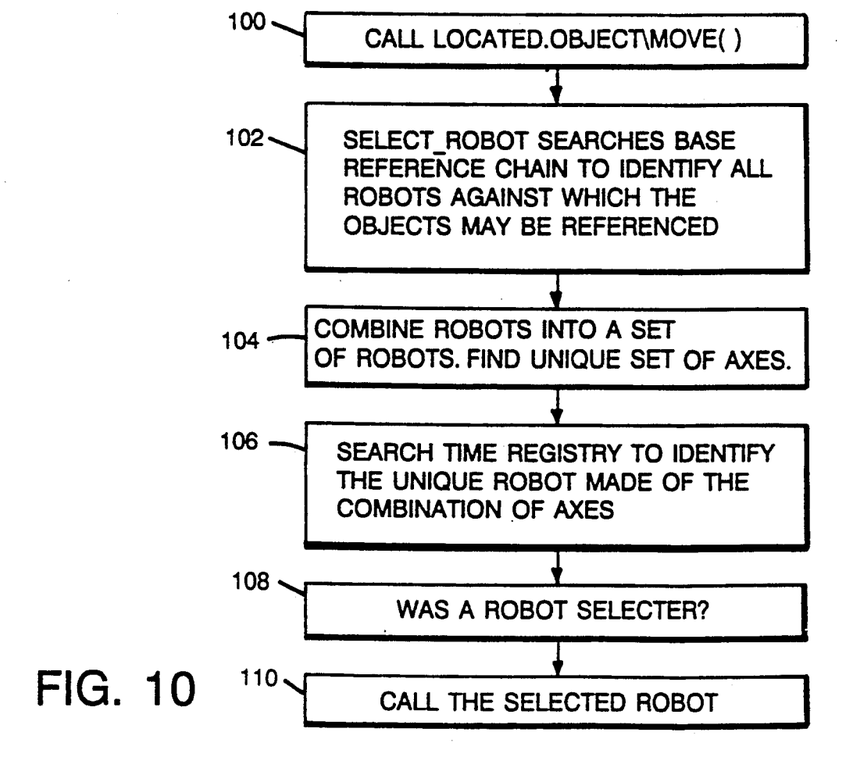
FIG. 10 is a flow chart of the dynamic robot selection process that is implemented by operators of located_object.

The application program calls the move operation on a located_object instance (step 100). For example, move(part, board, approach_traj, mot_sync).

Located_objectmove( ) calls located_objectselect_robot( ) to determine which robot is required to move for this command. Located_objectselect_robot( ) takes the two located objects in the move command (in this example part and board) and searches the base reference chain for any robots against which the object may be referenced (step 102). It combines these robots into a set of robots and calls robotcombined_robot( ) to retrieve an instance of a particular robot that is made from a combination of these robots (step 104). Robotcombined_robot( ) searches the robot.robots registry of robots to find the unique robot that is made from a combination of these robots (step 106). These last two steps are performed by first determining the unique set of axes associated with the combination of robots and then finding a unique robot that corresponds to the unique set of axes. It returns either the selected robot to the select_robot( ) call or an exception if no robot is specified for that particular combination of input robots. Then, located_objectselect_robot( ) checks that a robot was selected to perform the move (step 108). Exceptions are possible if no robots were in the base_reference chain of either referenced input arguments or if no robot was registered for that particular combination of axes. For example, if both board and part were referenced off of the same axis, there would be no way to move the part to the board using only that one axis. The application program would have had to be designed to have a tool pickup the part first.

Finally, located_objectmove( ) calls the robotmove_robot( ) operation on the returned selected robot instance (see below) (step 110).

In the described embodiment, the process of identifying the unique robot involves first identifying the set of axes represented by the set of robots and then determining whether that set of axes correspond to a unique robot within the workstation. This proceeds as follows. After the set of robots in the two base reference chains are identified, the select_robot operator uses the me.-made_of operator to determine for each of the identified robots whether it is made up of other robots. In this way, the robot manager decomposes the robots into constituent robots wherever possible. When no further decomposition into constituent robots is possible, the robot manager uses the me.axes attribute of the robot type to determine the complete set of motion axes represented by the collection of robots. That is, it goes through each robot on the list of robots and converts them into the corresponding set of motion axes. In the set of identified motion axes, each motion axes is represented only once even though it may be used by more than one robot in the identified set of robots. After the complete set of motion axes is determined, the robot manager checks whether this set corresponds to a unique robot within the workstation. To do this, it looks at each robot in the workstation (as identified in mytype.robots) and for each robot, it identifies the motion axes which make up that robot (as determined from the me.made_of attribute). It then compares that set to motion axes which make up the robot to the set of identified motion axes to find a match.

Robot Motion

The goal of robot motion is to move a specified object along some trajectory relative to another specified object. The robotics system automatically computes the Tool Center Point (TCP) for each move. This gives the application program independence from specific details of the tooling attached to a robot. An example of this independence is that it should not make a difference to the application program if a part is in a tool directly attached to a robot or is in a tool that is held by another tool that is then attached to the robot. The application program simply directs the part to move along the desired trajectory. Operators that are associated with the robot type compute the TCP to the part automatically.

Move_robot

As noted above, located_objectmove( ) calls robotmove_robot( ) on the robot that it chose as being required to perform the move. Robotmove_robot( ) performs the steps shown in the flow diagram of FIG. 11.

Figure 11:
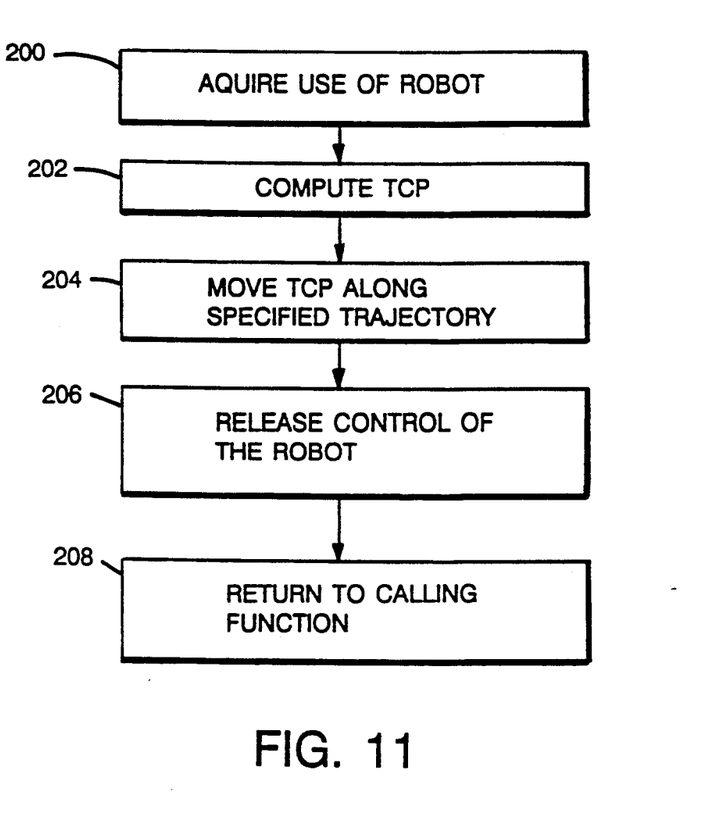
FIG. 11 is a flow chart of the operation of the move_robot operator of the robot type.

First, it acquires use of the robot (step 200). This is accomplished by using reimplemented access operations from man_resource. The robotics system allows sharing of axes among robots and also allows possible parallel application tasks. If any of the axes of the robot are being used by another task, an exception is returned that the robot is in use.

Next, it computes the new TCP (step 202). The TCP location is computed by finding the location of the first located_object argument (i.e., the part in our example) relative to the robot in its base_reference chain. This is done by relative_location(part, robot) operator described earlier.

Once the TCP has been computed, move_robot( ) moves the TCP along the specified trajectory (step 204). If the robot is a foreign robot with its own robot controller, then the appropriate TCP and move command is sent to its controller. If the robot is a native robot, then the robotics system computes the required motion axis commands to achieve coordinated motion of the TCP along the trajectory (see description below).

When the robot has completed the move, move_robot( ) releases control of the robot, which is accomplished through the man_resource access control facilities (step 206). Thus, when the motion command is finished, the axes of the robot are released for use by other move commands.

Finally, move_robot( ) returns to the caller located_objectmove( ) with successful completion or any exceptions (step 208). Possible exceptions are motion errors such as the command would cause an axis to exceed a limit, motion controller errors such as amplifier faults, etc.

Native_robot Coordinated Axis Motion

The robotics system implements coordinated multi-axis robotic control for those axes that do not have a robot controller. Robotic coordinated control algorithms are described in the literature (see, for example, Richard P. Paul cited above or John J. Craig, *Introduction to Robotics Mechanics and Control,* Addison-Wesley Publishing, 1986.).

In the described embodiment, the robotics system does not implement the servo loops to control the axis. Instead, it relies on the axes motion controller to provide the servo control and the interpolation to achieve good straight line trajectory following performance.

The robotics system provides the arm solutions and the motion planning to achieve the commanded TCP trajectory. The system's robotic control computes the velocity and position commands to send to each axes motion controller. These commands are derived from the specified world TCP trajectory and the axis configuration of the robot.

Arm Solutions

The robotics system converts the world space trajectory into an encoder space position and velocity command to issue to the axes motion controller. The algorithm that converts from a cartesian x,y,z TCP location to a set of encoder positions for the robot's motion axes is known as the reverse arm solution. The forward arm solution converts from encoder space for a set of robot axes into the cartesian space for the TCP of the robot. The abstract native_robot type of the robot interface provides the structure for computing any robot's arm solutions. The implementation details for a particular robot's axes configuration is performed by subtypes of robot (see FIG. 6). Both algorithms employ principles and techniques well known to persons skilled in the art.

The robot subtype heirarchy of the system is centered around cartesian style robots of various configurations. The derived classes include, for example, the following types: a slide_robot, a YZ robot, a YZ_theta robot, a YZ_X_by_theta robot, XYZ_theta robot, and a slide_and_bridge robot.

The slide_robot type is a 1 DOF linear axis robot. The axis may provide motion in the X, the Y, or the Z direction. The slide_robot type provides the arm solution routines for world space commands that the translation motion_axis does not provide. The YZ type is a 2 DOF cartesian robot in the Y and Z directions. The YZ_theta type is a 3 DOF cartesian robot that provides Y and Z translation and a rotation about the Z axis. The YZ_X_by_theta type is a 3 DOF cartesian robot that provides X, Y, and Z motion. The X motion is provided by using the theta axis. This robot cannot put the TCP at any arbitrary orientation since the theta rotation is used to position the TCP in X. The XYZ_theta type is a 4 DOF cartesian robot that provides X,Y,Z and a theta rotation about the Z axis. And, the slide_and_bridge type is a 2+ DOF cartesian split axis robot. A split axis robot does not carry the Y axis on the X axis (the Y axis is on a separate bridge that spans perpendicular to the X axis). It is made up of a slide_robot to provide the X motion and another robot that provides the Y motion and any optional DOF. An example is a slide_robot and a YZ robot, or a slide_robot and a YZ_Theta robot.

This implemented robot subtype heirarchy is flat. The design could be readdressed to group similar behavior differently, such as by the same number of DOF, cartesian or non-cartesian, etc.

The robotics system could also provide native_robot subtypes for other types including, for example, articulated arm, SCARA, cyclindrical, or spherical styles of robots. These additional styles of robots require a higher interpolation rate of the trajectory from world space to encoder space than the described embodiment requires. The higher rate provides good straight line trajectory performance of the TCP (see discussion below).

Generic Arm Solution Operation Specification

The robotics system can specify the programming interface to any type of native_robots arm solution. Individual arm solutions may have different algorithms for computing the solution so long as the calling arguments and return values conform to the specifications of the robot interface. The following sections describes the design of the relevant portions of that interface.

Location_Spaces

There are different coordinate spaces that can represent the desired configuration of a set of robotic motion axes. These spatial representations are grouped into a location_spaces data packet type. It has fields for the following attributes: me.encoders, me.joints, me.no_tool, me.robot, and me.world. The me.encoders attribute is the set of encoder values for each axis of the robot that put the TCP at the desired world location. The me.joints attribute is the set of axis positions in engineering units that put the TCP at the desired world location. The me.no_tool attribute is the location of the TCP base reference (its mount to the robot) that places the TCP at the desired world location. The me.robot attribute is the location of the TCP in the robot's reference frame. The robot's reference frame does not include the offset from the robot to the global world reference. And the me.world attribute is the location of the TCP in the world reference frame. This is the desired commanded location of the TCP.

The robot interface uses instances of location_spaces to make available all representations of the spaces that give the desired TCP location to its internal routines.

Reverse Arm Solution (World_To_Spaces)

The reverse arm solution for any native_robot type is performed by a robotworld_to_spaces( ) operator. This generic routine performs the location mathematics to fill in a location_spaces data packet. World_to_spaces( ) calls other routines, including robotreverse_arm_solution( ) and robotjoints_to_encoders( ). Robotreverse_arm_solution( ) is an operation in native_robot that implements the appropriate algorithm to specify the axis joint positions that will give the desired TCP location. Robotjoints_to_encoders( ) is a routine that converts axis positions from engineering units to encoder values. The default in native_robot assumes no inter-axis coupling and that just a linear scale factor converts from engineering joint space to encoder space. If there is inter-axis coupling, or non-linear conversion factors are required, subtypes of native_robot reimplement this routine.

Some robots do not have enough degrees of freedom, DOF, to achieve any desired location. The minimum number of DOF to achieve arbitrary positions and orientations of a TCP is 6 DOF. The located_object type allows the full 6 DOF specification for the TCP. It is possible that a commanded location cannot be achieved by a particular robot due to having too few DOF. The system allows a robot to decide if it wants to ignore the part of the location command it cannot achieve or to raise an exception. A robotDOF_compensation( ) operator returns a compensation location frame that world_to_spaces( ) can apply to the TCP command to convert it into an achievable command for how many DOF the robot may actually have. An example is to return a location frame that would undue the orientation part of the TCP location for a robot that does not have a rotation axis. The default is to return the identity location frame which does not apply any compensation. Subtypes can reimplement this routine to raise an exception or to produce a compensating location frame.

Forward Arm Solution (Encoders_To_Spaces)

The forward arm solution for any robot is performed by the routine robotencoder_to_spaces( ). This routine creates a filled in location_spaces data packet for a set of axes encoder values. Encoder_to_spaces( ) calls two other routines, namely, robotencoders_to_joints( ) and robotforward_arm_solution. Robotencoders_to_joints( ) converts from encoder values into engineering unit joint positions. The default assumes a linear conversion factor and no inter-axis coupling. Native_robot subtypes reimplement this routine to provide non-linear conversion or inter-axis coupling. Robotforward_arm_solution performs the forward arm solution algorithm for its particular axis configuration.

Location of the Robot

As noted earlier, robots are a subtype of located_object. They describe the location of some point on the robot relative to some base reference. The point of interest on a robot is the place that is used as the base_reference position of the TCP, typically referred to as the TCP mounting point. Each robot may select where this point is located but must then compute its arm solutions to that point. Typically, this point is some mounting flange on the robot where the tools are attached, but any position is possible as long as the arm solutions are consistent and the locations of objects attached to the robot are measured from this point.

In the located_object for the robot subtype, me.location is a computed field that reimplements the located_objectme.location field. It expresses the location of the base reference for the TCP (the tool's mounting point on the robot) in the robot's reference frame. This field is critical to the proper determination of the location of located_objects that have a robot in their base_reference chain. It calls the forward arm solution to compute the location of the TCP reference. For example, the forward arm solution gives the x, y, z and orientation values of the mounting flange.

The base_reference of the robot is the origin position for the robot coordinate system that the arm solutions use. This position is referred to as the robot origin. Any constant position on the robot is possible and is robot specific. The base_reference of the robot origin is the workstation. The location of the robot origin is the offset from the origin of the workstation to the base of the robot. The robot subtype also includes a me.robot_origin attribute. It is a located_position that describes the location of the robot's coordinate system relative to the workstation's coordinate system.

Axis Calibration or Homing

Some robotic motion axes have position encoders that report only a relative position for the axis. These types of encoders are referred to as incremental encoders. The motion controllers can establish a known reference position for each encoder and then report the encoder position relative to that known position. This reference position is typically determined by having a special index mark on the encoder. The motion controller moves the axis until this special index mark is found, and then resets its encoder counting circuitry to a known value. The motion controller can then report absolute encoder positions based from this special index mark. This process is known as "homing the axis" or "calibrating" an axis. The system provides the following routines to initiate this process.

The robot subtype includes a robotcalibrate(me) operation that can be used to have the robot perform a calibration routine that establishes absolute position of each motion axis of the robot. It is primarily used on robots that have incremental encoders that must be moved to a special known position, usually an index mark on the encoder, to establish the zero position of the encoder. Robotcalibrate(mytype) is an operation that calibrates all of the registered robots in the robotmytype.robots collection.

Location Space Updating

The described embodiment of the invention is a coupled motion system that works in conjunction with axis motion controllers. The system provides direct interfaces to the motion controllers through its communications pipeline facilities. It is possible to move the axes of the robot by directly commanding the motion controller. This would bypass the internal knowledge that the robot interface maintains on where an axis is located. This information is vital to correctly plan any subsequent motion under the control of the system. The system provides the following operations to update its knowledge of position of the axes of a robot. They are called whenever direct axis motion through the axis controller was performed.

A robotupdate_all_positions(mytype) operator updates the me.encoder values for each robot by directly asking the axis motion controllers. This operation updates the values for all the registered robots in the workstation. It finds the unique set of motion axes and then updates each axis encoder value and then updates the me.spaces field for each robot. A robotupdate_position(me) operator updates the me.encoder value for only the specified robot instance, me. It updates each axis encoder value and then updates the me.spaces field for this robot.

Location Related State Variables

The robots maintain several variables that describe some information about the state of the robot, including, me.here, me.spaces, and me.tool_frame. The me.here data field returns a location that represents the position of the last automatically determined TCP in the world reference frame. Me.spaces is a location_spaces object that represents the present state of the robot as described in encoder, joint, robot, and world space. It is maintained by the internal arm solution routines. And, me.tool_frame stores the automatically computed TCP and will typically vary for each move of the robot. These variables are of limited usefulness to application programs and are primarily useful for internal robot operations.

Comparison With Traditional Robot Syntax

It is helpful to compare the syntax used by the robotics system described herein to traditional robotic move syntax. At first glance, the motion command syntax of the robot interface does not appear to be vastly different from other robotic language motion commands. For example, an equivalent command in another robotic language (RAIL(R)-Automatix, Inc.) is:

MOVE MOT_ASYCH pallet_slot[1]:approach_path WITH speedsched[1]

This command tells a robot to move its Tool Center Point, TCP, along the path approach_path with a certain speed. The approach_path is relative to the location of the first pallet slot. The motion command should be performed asynchronously with the application program.

The implications of this traditional command are the following. First, the command is directed to a robot. If there are several robots in the workstation, the application needs to have a statement that selects which robot is the active robot for the MOVE statement. This requires that the application have knowledge of the workstation configuration and thus limits its reusability in other environments or with other workstations. For example, if there is only one robot, the application contains this implicit assumption and will not be reusable for configurations that have multiple robots.

Second, the TCP is moved rather than the part. Though this application example desires to move the part to the pallet, there is no knowledge of the part in this command. The application has to set the TCP location to be equal to the part location relative to the robot's TCP reference origin. This imbeds the knowledge of the tool and how it holds parts into the application. If a different tool or part is used, the application program will need to be modified.

Third, the motion path is relative to a location, namely, the pallet_slot[1]. This builds in knowledge of how the workstation is configured. Consider the situation if the pallet is placed on a cart and the cart is moved. This application program did not anticipate this situation and would need to be modified as follows:

CART:PALLET_SLOT[1]:APPROACH_PATH.

This knowledge is stored in the application program. If the configuration changes again, the program must be modified, again limiting reusability.

Though these differences may appear to be minor at first, careful consideration shows the large impact on the reusability of the application program. Each of the points raised above could be addressed by a carefully designed application program. Traditional robotic language constructs place a large burden on the application programmer to design a program for maximum reuse. The architecture of the robot interface shifts the burden for reusable code from the application programmer to the basic robot interface environment.

The traditional syntax also does not work directly with what the application program is typically interested in most, the part, tool, etc. Instead it limits the command to the TCP. The robot interface of the invention allows move commands on any located_object, e.g. part, tool, robot, and pallet. The robot interface then automatically selects the robot that must be moved and computes the correct TCP for the desired object. The important part of this automatic selection is that the application program does not need to know the structure of the workstation configuration. This is contained and maintained by the base_reference chain of located_object. The information is in the data and not the program. This allows reconfiguration of the workspace by modifying the base_reference chain data without needing to search all the application code and reprogram the application. This aids reusability and maintainability.

Other embodiments are within the following claims.

What is claimed is:

1. An interface for enabling an application program to control the movement of objects within a robotics workstation, said workstation including a plurality of objects, said plurality of objects being members of a group of objects, said interface comprising:

means for representing a model of the workstation, said model including a representation of the locations of objects within the workstation;

means for processing a command from the application program, said command identifying a first object of interest, a second object of interest and a desired movement, the first and second objects of interest being selected from among said plurality of objects, said processing means comprising:

means for identifying a robot that connects said first and second objects of interest within said model; and means for sending a motion command to the identified robot.

2. The interface of claim 1 wherein said model specifies relative locations of objects with respect to other objects within the workstation.

3. The interface of claim 1 wherein said workstation includes a plurality of robots each of which is made up of a corresponding set of motion axes and wherein said identifying means comprises:

a registry of all of said plurality of robots, said registry specifying for each of said plurality of robots a corresponding set of motion axes;

means for searching said model to identify a set of robots that connect said first and second objects of interest to each other within said workstation;

means for identifying a set of motion axes corresponding to said set of robots; and means for searching said registry to identify a single robot that corresponds to the identified set of motion axes, said single robot being said identified robot.

4. The interface of claim 1 wherein each of said objects is represented in said model by a corresponding data structure and wherein said model comprises one or more linked lists of data structures for said objects.

5. The interface of claim 4 wherein said locating means includes means for identifying, among said one or more linked lists, linked lists that contain the data structures corresponding to the first and second objects of interest and wherein said identifying means includes means for searching through the identified linked lists to identify said set of robots that connect said first and second objects of interest to each other within said workstation.

6. The interface of claim 5 wherein said locating means further includes means for identifying a single robot that corresponds to said identified set of robots, said single robot being said identified robot.

7. The interface of claim 1 further comprising means for computing a tool center point from at least one of said first and second objects of interest to said identified robot, and wherein said sending means also supplies the computed tool center point to said identified robot.

8. A method for enabling an application program to control the movement of objects within a robotics workstation, said workstation including a plurality of objects, said plurality of objects being members of a group of objects, said method comprising:
generating a model of the workstation, said model including a representation of the locations of objects within the workstation;
issuing a command from the application program, said command identifying a first object of interest, a second object of interest and a desired movement, the first and second objects of interest being selected from among said plurality of objects;
in response to receiving the identity of the first and second objects of interest, automatically identifying a robot that connects said first and second objects of interest within said model; and
sending a motion command to the identified robot.

9. The method of claim 8 wherein said model specifies relative locations of objects with respect to other objects within the workstation.

10. The method of claim 8 wherein said workstation includes a plurality of robots each of which is made up of a corresponding set of motion axes and wherein said identifying step comprises:
searching said model to identify a set of robots that connect said first and second objects of interest to each other within said workstation;
identifying a set of motion axes corresponding to said set of robots; and
searching a registry of all of said plurality of robots to identify a single robot that corresponds to the identified set of motion axes, said registry specifying for each of said plurality of robots a corresponding set of motion axes, said single robot being said identified robot.

11. The method of claim 8 wherein each of said objects is represented in said model by a corresponding data structure and wherein said model comprises one or more linked lists of data structures for said objects.

12. The method of claim 11 wherein said locating step comprises identifying, among said one or more linked lists, linked lists that contain the data structures corresponding to the first and second objects of interest and wherein said robot identifying step comprises searching through the identified linked lists to identify said set of robots that connect said first and second objects of interest to each other within said workstation.

13. The method of claim 12 wherein said locating step further includes identifying a single robot that corresponds to said identified set of robots, said single robot being said identified robot.

14. The method of claim 8 further comprising computing a tool center point from at least one of said first and second objects of interest to said identified robot, and wherein said sending step also supplies the computed tool center point to said identified robot.

* * * * *